June 12, 1951  J. M. THOMPSON  2,556,348
ADJUSTABLE LOCKING SUPPORT
Filed Sept. 17, 1948
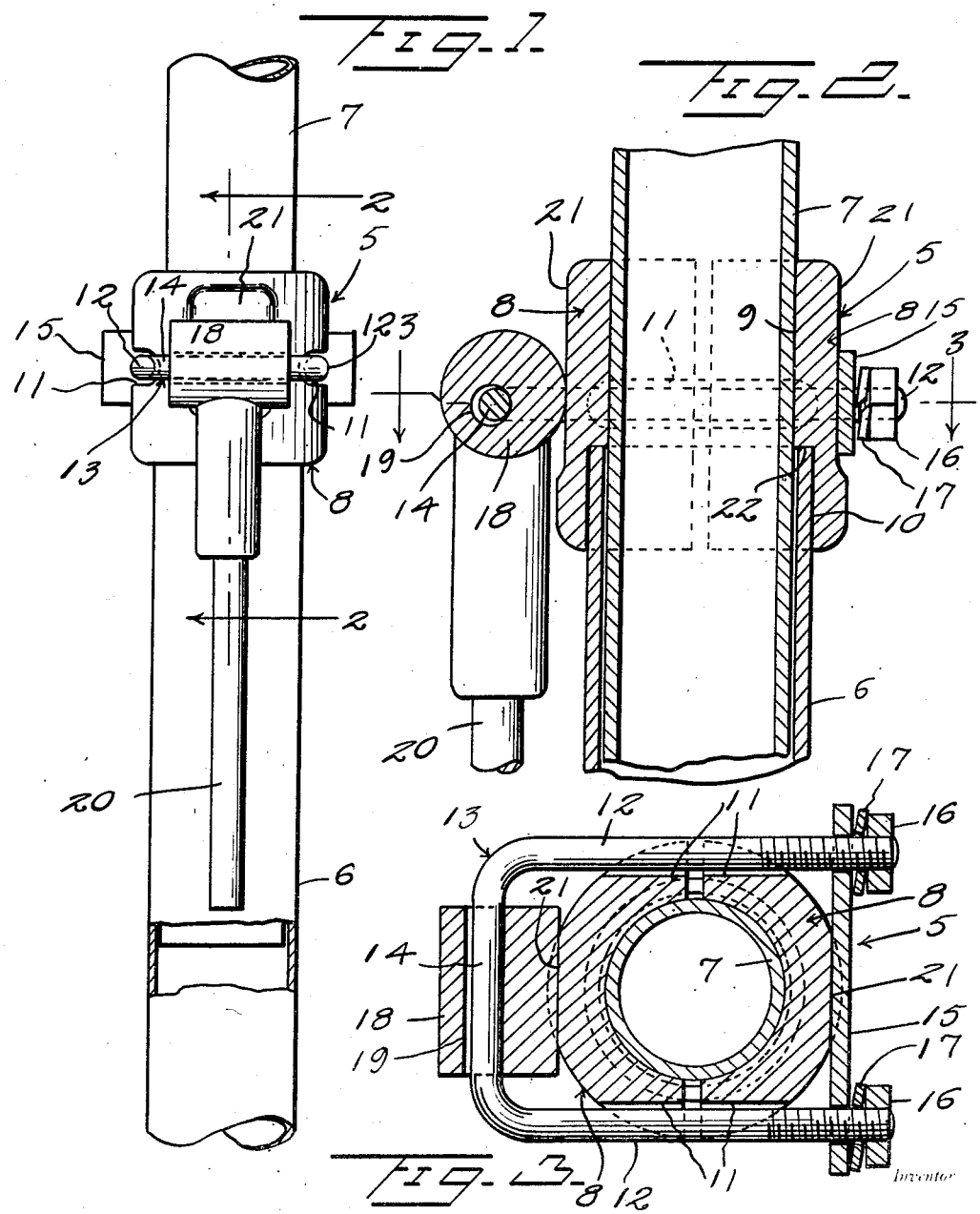
Inventor
John M. Thompson
By John N. Randolph
Attorney Patented June 12, 1951

2,556,348

UNITED STATES PATENT OFFICE 2,556,348

ADJUSTABLE LOCKING SUPPORT

John M. Thompson, Manchester, Iowa

Application September 17, 1948, Serial No. 49,832

8 Claims. (Cl. 287—58)

1

This invention relates to an adjustable support adapted to be yieldably and detachably locked on one element for swively supporting said element in superposed relationship to another element and is particularly applicable for connecting conduits of different diameters in superimposed, partially telescoped relationship whereby an upper conduit of reduced diameter may be adjustably and swively supported telescopically in a lower conduit; however, it will be readily apparent as the description proceeds that the adjustable locking support is likewise adapted for other purposes such as connecting rods or solid elements and so that an upper element will be swively supported on a lower element.

Another object of the invention is to provide an adjustable locking support through the use of which an upper element may be adjustably supported on a lower element in various extended positions with respect thereto and so that the upper element with a load carried thereby may swivel relatively to the lower element.

Still a further and important object of the invention is to provide an adjustable locking support having resilient means for permitting the support to be locked to the smaller of two elements and released from locked engagement therewith and whereby the support will be yieldably clamped to said smaller element.

Various other objects and advantages of the invention will hereinafter become more fully apparent from the following description of the drawing, illustrating a preferred embodiment and application of the invention and wherein:

Figure 1 is a front elevational view showing the support locked to an upper tubular conduit for supporting said conduit in telescoped relationship in a lower conduit;

Figure 2 is an enlarged longitudinal sectional view thereof taken substantially along a plane as indicated by the line 2—2 of Figure 1, and Figure 3 is a cross sectional view of the parts taken substantially along a plane as indicated by the line 3—3 of Figure 2.

Referring more specifically to the drawing, for the purpose of illustrating one preferred application and use of the adjustable locking support, designated generally 5 and comprising the invention, a fixed lower tubular conduit or pipe is shown at 6 and an upper tubular conduit or pipe is shown at 7. The pipe 7 is of a smaller external diameter than the internal diameter of the pipe 6 and has its lower end telescoped in the upper end of the pipe 6 as clearly illustrated in Figures 1 and 2.

The adjustable supporting clamp 5 includes a pair of corresponding clamp sections 8 each of which is generally of semi-circular cross section both internally and externally thereof and which combine to form a bore of substantially circular cross section which extends longitudinally therethrough and which includes an upper portion 9 of restricted diameter and a lower portion 10 of a larger diameter. The clamp sections 8 are provided adjacent their side edges with aligned grooves 11 which extend along opposite sides of the clamps for receiving the substantially parallel legs 12 of a U-bolt, designated generally 13 having an intermediate portion 14 which is disposed substantially at a right angle to the legs 12. A bar or cross-head 15 is provided with an opening adjacent each end thereof for loosely engaging the threaded terminals of the legs 12 and each of said threaded terminals carries a nut 16, outwardly of the crosshead 15. Between the crosshead 15 and each of the nuts 16, a resilient expansion element is disposed on each of the legs 12, said elements being illustrated as spring washers 17. However, if desired and particularly if the clamp or locking support 5 is relatively large, an expansion type coil spring could be substituted for the spring washers 17.

The locking support or clamp 5 is provided with a locking cam comprising a roller 18 having an eccentric bore 19 for loosely engaging the intermediate portion 14 of the U-bolt 13 for journaling said cam 18 thereon and an elongated handle 20 projects perpendicularly from a portion of the cam or roller 18 and is disposed with respect to the bore thereof, as illustrated in Figure 2, so that when the cam is in an engaged and locked position the handle 20 will be disposed substantially parallel to the axis of the clamp sections 8 and likewise parallel to the pipes 6 and 7. The clamp sections 8 are preferably provided with flat external surfaces 21 disposed intermediate of their side edges, one of which is adapted to be engaged by the cam 18 and the other of which is engaged by the intermediate portion of the crosshead or bar 15.

From the foregoing it will be readily apparent that the clamp sections 8 could be positioned about a portion of the pipe or conduit 7 at any desired distance from its lower end after which the U-bolt 12 is applied as illustrated in the drawing and connected by the bar 15 and nuts 16 with the spring washers 17 interposed therebetween. While the nuts 16 are being applied to the threaded ends of the U-bolt 13, the handle 20 is swung upwardly through an arc of approximately 180° from its position of Figures 1 and 2 so that the cam 18 is in a retracted position. The nuts 16 are tightened so that the bore portion 9 loosely engages around a portion of the pipe 7 after which the handle 20 is swung downwardly in a counterclockwise direction to its position of Figure 2 for moving the cam 18 to an operative position to thereby draw the clamp sections 8 toward one another so that the pipe 7 will be clamped in the bore portion 9. The spring washers 17 will permit the cam 18 to be thus moved to an engaged position and so that the periphery of the cam 18 which is most remote to its bore 19 can move into and slightly beyond engagement with the adjacent clamp section 8 for yieldably locking the cam in an engaged position. The pipe 7 with the adjustable support or clamp 5 thus adjustably clamped thereto may then be lowered relatively to the lower, fixed pipe 6 and so that the lower end thereof will telescope into the upper end of the pipe 6 and so that the upper end of the pipe 6 will telescope into the enlarged bore portion 10 of the clamp and will rest upon the downwardly facing annular shoulder 22 formed by the bore portions 9 and 10. Thus, the adjustable locking support 5 will function for adjustably supporting the pipe 7 and any load, not shown, carried thereby on the pipe 6 and so that said pipe 7 with the locking support 5 may swivel relatively to the pipe 6.

It will likewise be readily obvious that two solid rods or other elements of circular cross section and different diameters could be similarly mounted one above the other as by clamping the lower end of the upper element of smaller diameter in the bore 9 and with the upper end of the lower element of larger diameter extending into the bore portion 10 and resting on the shoulder 22.

The adjustable locking support 5 may obviously be made in various sizes for connecting conduits or other elements of various sizes and said support may be formed in various ways such as by casting or stamping.

Various other modifications and changes are likewise contemplated and may obviously be resorted to, without departing from the spirit or scope of the invention as hereinafter defined by the appended claims.

I claim as my invention:

1. An adjustable locking support for detachably connecting members of different cross sectional sizes comprising a pair of corresponding clamp sections defining a bore extending longitudinally therethrough and including an upper bore portion and a lower bore portion, said lower bore portion being larger than the upper bore portion for defining a downwardly facing shoulder therebetween, said lower bore portion being adapted to receive the upper end of a lower member, said upper bore portion being adapted to receive a portion of an upper member, an adjustable fastening engaging detachably around said clamp sections including adjustable fastening elements and resilient tensioning means, and a manually actuated cam carried by a portion of said fastening and rotatable relatively thereto for moving said cam into or out of engagement with one of said clamp sections for cooperation with said fastening for drawing the clamp sections into clamping engagement with said upper member when the cam is moved to an engaged position, said resilient tensioning means being disposed between certain of the adjustable fastening elements to yieldably mount the portion of the fastening which supports the cam relatively to the clamp section engaged by the cam.

2. An adjustable locking support as in claim 1, said fastening including a U-bolt having a crosshead slidably engaged on the legs thereof and disposed for engagement with an intermediate portion of one of said clamp sections, and said cam being eccentrically mounted for turning movement on the intermediate portion of said U-bolt and disposed for movement into engagement with the other of said clamp sections whereby said cam and crosshead will cooperate to displace the clamp sections toward one another and into clamping engagement with said upper member when the cam is moved toward an engaged position.

3. An adjustable locking support as in claim 1, said fastening including a U-bolt having a crosshead slidably engaged on the legs thereof and disposed for engagement with an intermediate portion of one of said clamp sections, and said cam being eccentrically mounted for turning movement on the intermediate portion of said U-bolt and disposed for movement into engagement with the other of said clamp sections whereby said cam and cross head will cooperate to displace the clamp sections toward one another and into clamping engagement with said upper member when the cam is moved toward an engaged position, said adjustable members comprising nuts adjustably engaging threaded terminals of the legs of the U-bolt, and said resilient tensioning means comprising split spring washers mounted on the legs of the U-bolt between said nuts and the crosshead for yieldably urging the crosshead toward the clamp sections and to permit said cam to be rocked to a locked position.

4. An adjustable locking support as in claim 1, said upper and lower members being of circular cross section and the upper end of said lower member engaging loosely in the lower bore portion of the clamp sections whereby said locking support and upper member are swivelly mounted on the lower member.

5. An adjustable locking support as in claim 1, said clamp sections, adjacent their side edges, being provided with aligned transverse grooves for receiving portions of legs of the fastening to retain said fastening against turning movement relatively to the clamp sections when in an applied position and for supporting the fastening thereon when said cam is in a released position.

6. An adjustable locking support as in claim 1, said fastening including a U-bolt having substantially parallel legs, and said clamp sections having aligned grooves for receiving portions of said legs for non-rotatably supporting the fastening on the clamp sections.

7. An adjustable locking support as in claim 1, said clamp sections having adjacent side edges disposed in spaced relationship to one another when the clamp sections are in engaged position.

8. An adjustable locking support as in claim 1, said upper and lower members being of circular cross section, the lower end of the upper member being slidably and rotatably disposed in the upper end of the lower member, the upper end of said lower member engaging loosely in the lower bore portion of the clamp sections for swivelly supporting the locking support and upper member on the lower member.

JOHN M. THOMPSON.

REFERENCES CITED

The following references are of record in the file of this patent:

UNITED STATES PATENTS

| Number | Name | Date |
|---|---|---|
| 571,461 | Swanson | Nov. 17, 1896 |
| 928,367 | De Witt | July 20, 1909 |
| 1,210,321 | Hultquist | Dec. 26, 1916 |
| 2,352,496 | Rose | June 27, 1944 |

FOREIGN PATENTS

| Number | Country | Date |
|---|---|---|
| 26,578 | Great Britain | Dec. 4, 1903 |